United States Patent
Hemmen et al.

(10) Patent No.: US 11,986,776 B2
(45) Date of Patent: May 21, 2024

(54) METHOD FOR FORMING A BODY COMPRISING AT LEAST ONE THROUGH-GOING PASSAGE

(71) Applicant: Condalign AS, Oslo (NO)

(72) Inventors: Henrik Hemmen, Oslo (NO); Tina Bryntesen, Oslo (NO); Linn Cecilie Sørvik, Oslo (NO); Marie-Audrey Marguerite Adrienne Raux, Oslo (NO); Guttorm Johan Osborg, Oslo (NO)

(73) Assignee: CONDALIGN AS, Oslo (NO)

( * ) Notice: Subject to any disclaimer, the term of this patent is extended or adjusted under 35 U.S.C. 154(b) by 623 days.

(21) Appl. No.: 16/495,221

(22) PCT Filed: Mar. 28, 2018

(86) PCT No.: PCT/EP2018/025075
§ 371 (c)(1),
(2) Date: Sep. 18, 2019

(87) PCT Pub. No.: WO2018/177607
PCT Pub. Date: Oct. 4, 2018

(65) Prior Publication Data
US 2021/0187444 A1     Jun. 24, 2021

(30) Foreign Application Priority Data

Mar. 29, 2017 (NO) .................................. 20170513

(51) Int. Cl.
| | | |
|---|---|---|
| *B01D 69/02* | (2006.01) | |
| *B29C 71/00* | (2006.01) | |
| *B29K 23/00* | (2006.01) | |
| *B29K 69/00* | (2006.01) | |
| *B29K 75/00* | (2006.01) | |
| *B29K 105/00* | (2006.01) | |
| *B29K 307/04* | (2006.01) | |
| *B29K 309/02* | (2006.01) | |
| *B29K 309/08* | (2006.01) | |
| *C08J 5/18* | (2006.01) | |

(52) U.S. Cl.
CPC .......... *B01D 69/02* (2013.01); *B29C 71/0081* (2013.01); *C08J 5/18* (2013.01); *B29K 2023/06* (2013.01); *B29K 2023/12* (2013.01); *B29K 2069/00* (2013.01); *B29K 2075/00* (2013.01); *B29K 2105/251* (2013.01); *B29K 2307/04* (2013.01); *B29K 2309/02* (2013.01); *B29K 2309/08* (2013.01)

(58) Field of Classification Search
CPC ............ B29C 71/0081; B01D 2323/35; B01D 2325/42; B01D 67/003; B01D 2325/021
See application file for complete search history.

(56) References Cited

U.S. PATENT DOCUMENTS

| | | |
|---|---|---|
| 5,102,547 A | 4/1992 | Waite et al. |
| 6,348,675 B1 | 2/2002 | Takagi |
| 2005/0258573 A1 | 11/2005 | Daiki et al. |
| 2009/0131244 A1 | 5/2009 | Bishop et al. |
| 2010/0070026 A1 | 3/2010 | Ito et al. |
| 2011/0054050 A1* | 3/2011 | Fuller .................... C08J 5/2237 429/492 |
| 2012/0228214 A1 | 9/2012 | Beard et al. |
| 2014/0243440 A1* | 8/2014 | Badyal ................... B05D 3/107 521/64 |
| 2015/0109008 A1* | 4/2015 | Godin .................... B01D 65/02 324/699 |
| 2016/0096334 A1 | 4/2016 | Sander et al. |
| 2016/0327513 A1 | 11/2016 | Yanagi et al. |

FOREIGN PATENT DOCUMENTS

| | | | | |
|---|---|---|---|---|
| DE | 102006036863 A1 | | 2/2008 | |
| EP | 2436722 A1 | * | 4/2012 | ......... B01D 67/0006 |
| EP | 2947662 A1 | | 11/2015 | |
| JP | 2003149096 A | | 5/2003 | |
| KR | 20040065460 A | | 7/2004 | |
| WO | WO-01/97950 A1 | | 12/2001 | |
| WO | WO-0197950 A1 | * | 12/2001 | ......... B01D 67/0018 |
| WO | WO-2009/069110 A1 | | 6/2009 | |
| WO | WO-2013/078464 A1 | | 5/2013 | |
| WO | WO-2016/086089 A1 | | 6/2016 | |

OTHER PUBLICATIONS

International Search Report and Written Opinion were dated Aug. 23, 2018 by the International Searching Authority for International Application No. PCT/EP2018/025075, filed on Mar. 28, 2018 and published as WO 2018/177607 on Oct. 4, 2018 (Applicant—Condalign AS) (17 Pages).

* cited by examiner

*Primary Examiner* — Ryan B Huang
(74) *Attorney, Agent, or Firm* — Ballard Spahr LLP

(57) ABSTRACT

A method is described for forming a body having at least one through-going passage, said method has the steps of:
 a) providing a mixture comprising particles and at least one liquid pocket inside a curable matrix,
 b) subjecting said mixture to a first alternating voltage having a first frequency to form a body in which said at least one liquid pocket extends from a first surface of said body to a second surface of said body thereby forming at least one through-going passage lacking curable matrix, and
 c) curing said curable matrix into a cured matrix,
wherein at least some of said particles are located at an interface between said at least one through-going passage comprising liquid and said cured matrix.

18 Claims, 8 Drawing Sheets

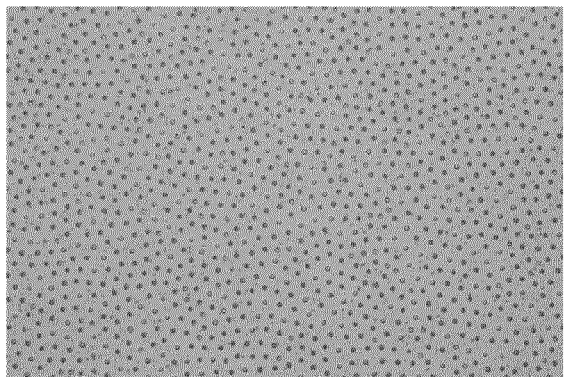 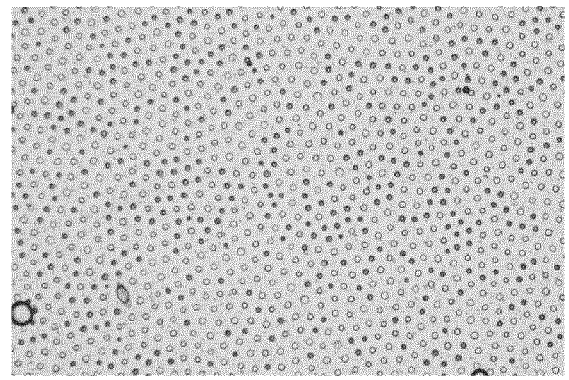
Fig. 8a                Fig. 8b
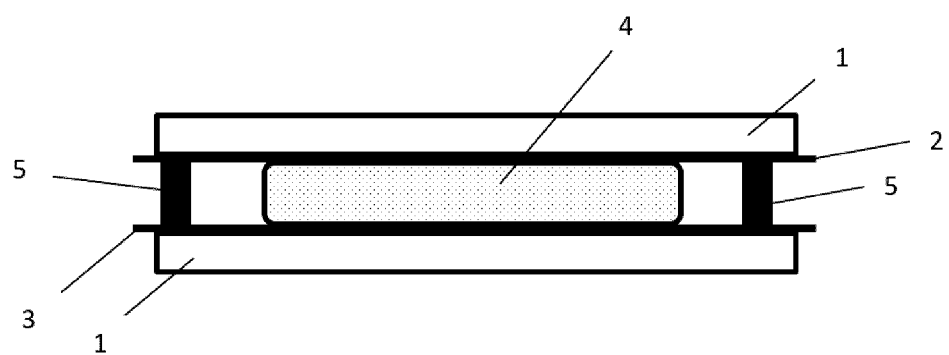
Fig. 9

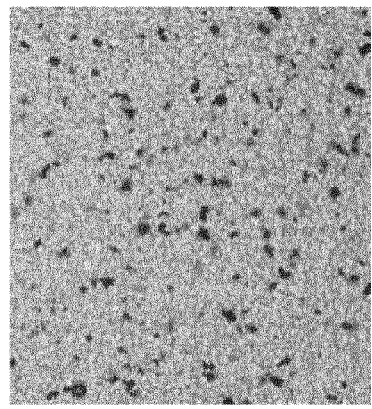 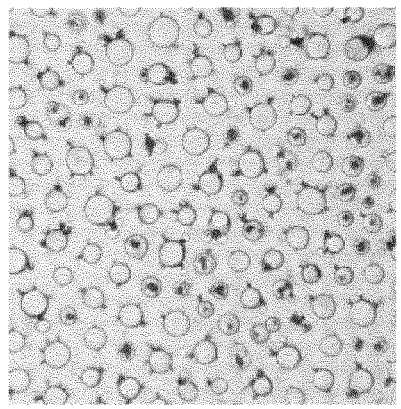 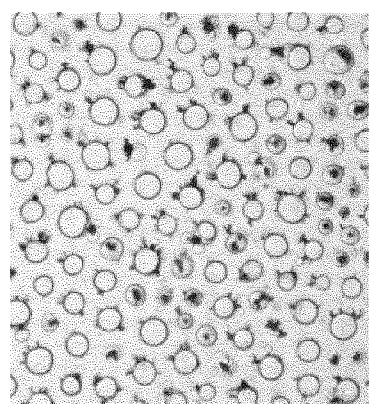
*Fig. 10a*      *Fig. 10b*      *Fig. 10c*
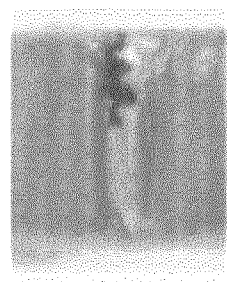
*Fig. 11*
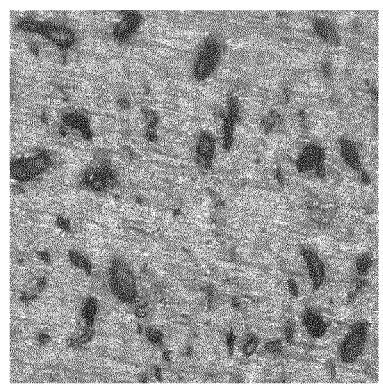 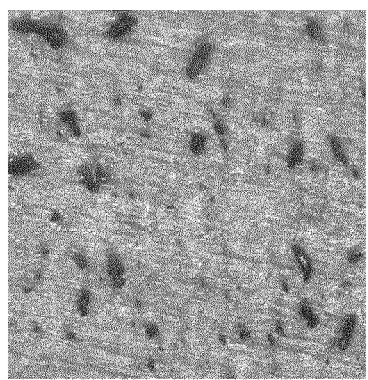 
*Fig. 12a*      *Fig. 12b*      *Fig. 12c*

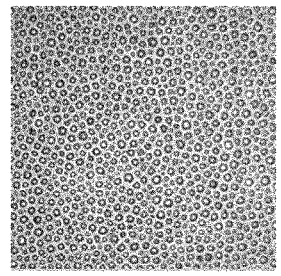 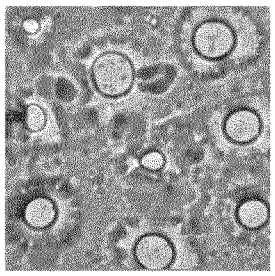 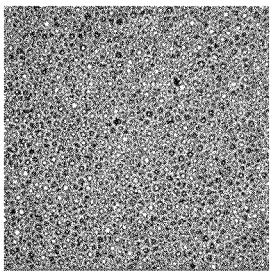 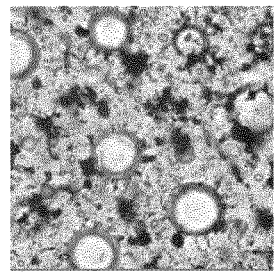
*Fig. 15a*  *Fig. 15b*  *Fig. 15c*  *Fig. 15d*
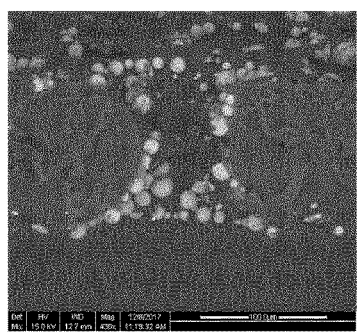 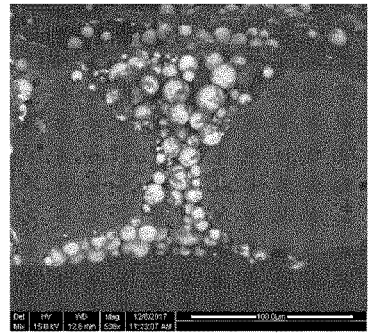 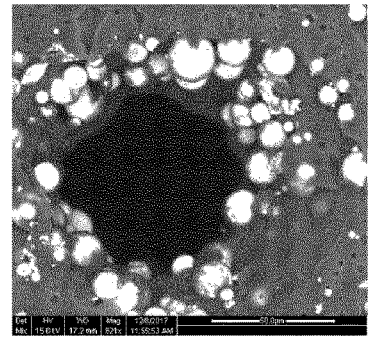
*Fig. 16a*  *Fig. 16b*  *Fig. 16c*
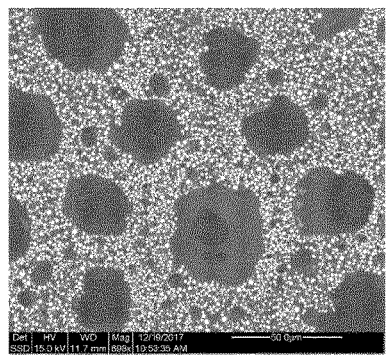 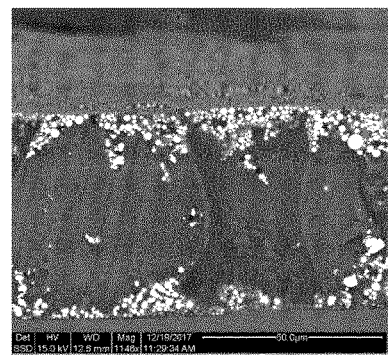
*Fig. 17a*  *Fig. 17b*

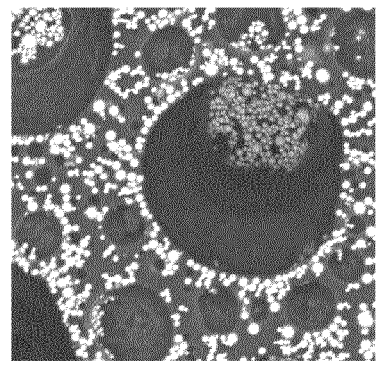 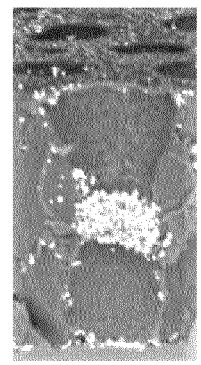
Fig. 18a                Fig. 18b
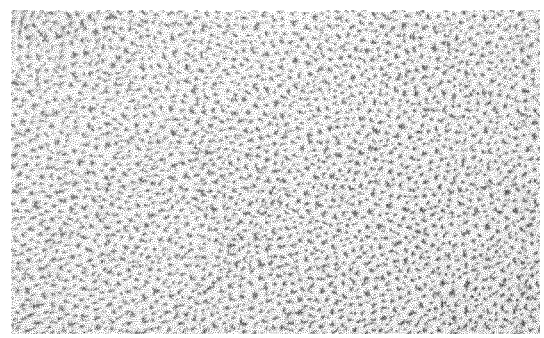
Fig. 19a
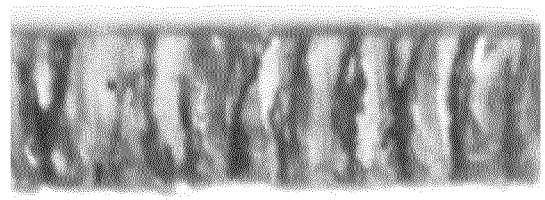
Fig. 19b

METHOD FOR FORMING A BODY COMPRISING AT LEAST ONE THROUGH-GOING PASSAGE

CROSS-REFERENCE TO RELATED APPLICATIONS

This application is a U.S. National Phase Application of International Application No. PCT/EP2018/025075, filed Mar. 28, 2018, which claims priority to Norwegian Application No. 20170513, filed Mar. 29, 2017, each of which are hereby incorporated by reference in their entirety.

TECHNICAL FIELD

The present invention relates to a method for forming a body comprising at least one through-going passage. The through-going passage may comprise a liquid, which may be removed thereby forming a through-going hole, or a liquid metal which may be subsequently solidified. The invention also relates to articles obtainable by said method.

BACKGROUND

Synthetically produced porous materials are used in many areas for various purposes, such as insulation, cushioning, impact protection, catalysis and membranes. The material may be organic or inorganic, and the pores may be of different or uniform size and/or shape. The selection of the specific material and the pore characteristics will influence the properties of the resulting material and its suitability for a specific purpose.

Frequently, it is desired to produce and use permeable materials in which pores allow for transportation of components through said pores. For instance, porous membranes are a class of materials comprising a layer or sheet including through-going pores allowing specific components to pass through said pores from one side of the membrane to another side of the membrane while other components are prevented from passing through the membrane pores. The components may be molecules, ions or small particles.

There are also many instances where it is desired to trap components within the material pores thereby functionalizing the material with the trapped component. Examples of such materials include zeolites, catalyst, anisotropic materials and drug delivery devices. The components of such materials may be trapped during or after the synthesis of the material.

U.S. Pat. No. 6,479,007 discloses an apparatus and method for controlling the pore structure of thin polymeric sheets, such as porous membranes and thin films, during solvent casting or interfacial polymerization. The method involves a non-uniform electric field generated in proximity to a liquid film in which a desired pore structure is to be formed.

KR20040065460 discloses a method for producing solid porous film wherein an electric field is applied to align long cylindrical pores.

To increase the versatility and/or availability of porous materials, and/or enable industrial production thereof, there remains a need for alternative methods in this field.

US 2011/0054050 discloses an ion exchange membrane having a lamellar morphology and a process of making the same. The process involves a block copolymer, and provides a membrane with a bicontinuous morphology.

It is an object of the present invention to provide a method fulfilling said need.

SUMMARY OF THE INVENTION

The above-mentioned object is achieved by a method for forming a body comprising at least one through-going passage.

The method comprises the steps of:
a) providing a mixture comprising particles and at least one liquid pocket inside a curable matrix,
b) subjecting said mixture to a first alternating voltage having a first frequency to form a body in which said at least one liquid pocket extends from a first surface of said body to a second surface of said body thereby forming at least one through-going passage lacking curable matrix, and
c) curing said curable matrix into a cured matrix,
wherein at least some of said particles are located at an interface between said cured matrix and said at least one through-going passage lacking curable matrix The mixture of step a) may be provided by application of a second alternating voltage having a second frequency to a mixture of particles, liquid and curable matrix. The application of the second alternating voltage having a second frequency to the mixture of liquid particles, liquid and curable matrix results in the formation of liquid pockets dispersed within the curable matrix with at least some of said particles located at an interface between the liquid pockets and the curable matrix. The liquid pockets may have the form of droplets such as substantially spherical droplets. Alternatively or additionally, the mixture of step a) may be provided by subjecting a mixture comprising particles. liquid and curable matrix to at least one of the following: stirring, vortexing, homogenization, sonication. For instance, the stirring, vortexing, homogenization and/or sonication may be performed in combination with application of the second alternating voltage having a second frequency. The combination may take place simultaneously or sequentially.

The particles may comprise or consist of at least one of the following: a metal, ceramic, glass, carbon allotrope, organic material. It will be appreciated that the particles may be a mixture of particles such as a mixture of particles of various kinds, shapes and/or sizes. Further, the amount of particles may be adjusted as desired. Further particles may be added during steps b) and/or c) in the method described herein. Additionally or alternatively, the particles may also be added to the through-holes described herein.

Examples of ceramic particles include particles comprising or consisting of at least one of the following: aluminium oxide, boron nitride, aluminium nitride. Particles containing organic material may be carbon containing particles such as particles comprising or consisting of at least one of the following: graphite, carbon nanotubes, glassy carbon, graphene. Examples of metallic particles include particles comprising or consisting of at least one of the following: silver, gold, copper, aluminium, zinc, tin, nickel. The particles may also include coated particles such as nickel coated graphite particles and/or silver coated glass particles. Further examples of particles include particles of functionalized organic material and particles comprising catalysts such as platinum.

In an example, the particles described herein may comprise a metal such as iron, a polymer such as polyurethane and/or glass. The particles may be coated with a metal or mixture of metals such as silver or a mixture of nickel and gold.

In a further example, the particles may comprise or consist of graphene oxide such as reduced graphene oxide. In still a further example, the particles may comprise or consist of a metal such as zinc.

The particles may be substantially three-dimensional such as spherical particles. Alternatively, the particles may be substantially two-dimensional. In this document, a two-dimensional particle intends a particle in which one dimension is negligible with respect to at least one of the other cross-sectional dimensions of the particle. For instance, a two-dimensional particle may be a particle having a width and/or length that is about from 100 to 10.000 times larger than the particle thickness, wherein the particle thickness is the smallest cross-sectional dimension. The particles may be a mixture of three-dimensional and two-dimensional particles.

The particle size may be within the range of from 0.1 nanometers to 50 micrometers such as from 0.2 micrometers to 50 micrometers. The particle size may refer to the particle diameter. Alternatively, the particle size may refer to the largest cross-sectional dimension of the particle.

The present disclosure also provides a method for forming a body comprising at least one through-going passage as described herein, wherein the mixture of step a) lacks particles and is provided by application of a second alternating voltage having a second frequency to a mixture of liquid and curable matrix. Thus, there is provided a method for forming a body comprising at least one through-going passage, said method comprising the steps of:
  a) providing a mixture comprising at least one liquid pocket inside a curable matrix,
  b) subjecting said mixture to a first alternating voltage having a first frequency to form a body in which said at least one liquid pocket extends from a first surface of said body to a second surface of said body thereby forming at least one through-going passage lacking curable matrix, and
  c) curing said curable matrix into a cured matrix,
  wherein the mixture of step a) is provided by application of a second alternating voltage having a second frequency to a mixture of liquid and curable matrix. Additionally, the mixture of step a) may be provided by subjecting a mixture curable matrix and liquid to at least one of the following: stirring, vortexing, homogenization, sonication. For instance, the stirring, vortexing, homogenization and/or sonication may be performed in combination with application of the second alternating voltage having a second frequency. The combination may take place simultaneously or sequentially. It will be appreciated that steps b) and c) may involve addition of particles such as particles described herein. Alternatively, steps b) and/or c) do not involve particles.

It will be appreciated that the expression "thereby forming at least one through-going passage lacking curable matrix" in step b) of the method described herein intends "thereby forming at least one through-going passage lacking curable matrix in said body".

The at least one passage lacking curable matrix of the method described herein may be at least one through-going passage comprising liquid. It will be appreciated that the liquid of said through-going passage may be the same liquid as that of the liquid pocket of step a) of the method described herein. When particles are present, at least some of said particles may be located at an interface between said curable matrix and said at least one through-going passage lacking curable matrix.

The through-going passage lacking curable matrix may be transformed into through-going holes in a subsequent step. Accordingly, the method described herein may further comprise a step of:
  d) removing the liquid from said at least one through-going passage thereby forming at least one through-going hole.

When particles are present, at least some of said particles may be located at an interface between said curable matrix and said at least one through-going passage lacking curable matrix. Further, upon removal of the liquid from the at least one through-going passage at least some of the particles may be exposed in the resulting at least one through-going hole. The particles located at said interface and/or exposed in the formed at least one through-going hole may provide the resulting body with desired properties. In other words, the particles may functionalize the body produced in accordance with the present invention. This is a significant benefit since it allows for producing bodies with different characteristics. Thus, the kind of particles may be selected to suit a particular end use of the body being produced.

The creation and distribution of the liquid pockets within the curable matrix may be monitored. The monitoring may take place using a light microscope optionally in combination with image analysis such as a digital image analysis. Moreover, the second alternating voltage having a second frequency may be adjusted to provide for the desired formation and dispersion of the liquid pockets. For instance, if monitoring reveals that formation and/or dispersion of the liquid pockets within the curable matrix is/are not satisfactory the second alternating voltage having a second frequency may be adjusted until the desired formation and/or dispersion is achieved. Thus, the step of providing the mixture of step a) described herein may include monitoring the formation and dispersion of liquid pockets within the curable matrix and/or adjusting the second alternating voltage having a second frequency. The subsequent method steps may then be performed when the dispersion and/or formation of the liquid pockets is/are considered satisfactory.

Frequently, it may be desired to obtain liquid pockets of substantially the same size, i.e. monodisperse liquid pockets. The method described herein allows for producing liquid pockets of substantially the same size or of different size.

Upon subjecting the mixture of step a) to step b) in the method described herein, the shape of the liquid pockets changes so that they extend from a first surface of the body to a second surface of the body thereby forming at least one through-going passage lacking curable matrix in said body. For instance, the resulting shape may be such that its cross section is column like, ellipsoid like, spheroid like, hourglass like or meniscus like. The resulting shape will be affected by the magnitude of the first alternating voltage having a first frequency. The change in shape may be monitored by a light microscope optionally in combination with image analysis. It will be appreciated that the first alternating voltage having a first frequency may be adjusted to provide a desired shape. For instance, if monitoring reveals that the shape of the liquid pockets within the curable matrix is not satisfactory the first alternating voltage having a first frequency may be adjusted until the desired shape is achieved. Thus, step b) of the method described herein may involve monitoring of the liquid pockets within the curable matrix and/or adjusting the first alternating voltage having a first frequency.

When the desired shape of the through-going passage has been obtained in step b) application of step c) provides curing of the curable matrix. Depending on the composition of the curable matrix, curing may be achieved by at least one of the following: curing agents, heat, moisture, radiation such as ultraviolet radiation (UV) or any other way known in the art. The step of curing solidifies the curable matrix. The resulting body comprises through-going passages lacking curable matrix within the cured matrix.

It will be appreciated that the method of the present invention allows for varying the size, shape, and distribution of the through-going passages and/or through-going holes. As a result, bodies for very different applications may be produced. For instance, bodies produced in accordance with the method described herein may be used for catalysis, in membrane technology etc. In an example, the body is a membrane.

The liquid comprised within the at least one through-going passage lacking curable matrix as described herein may be removed liquid using methods known in the art such as air blowing, drying, blotting, evaporation, and/or washing with a liquid. In the latter case, the washing liquid may be different from the liquid being removed. However, when the liquid is a liquid metal it is preferred not to perform the step of removal. Instead, curing, annealing, and/or temperature lowering may be performed as described herein whereby said liquid metal is solidified.

Thus, the at least one liquid pocket described herein may be a liquid metal pocket. In such a case, the step of curing, annealing, and/or a step of temperature lowering solidifies the liquid metal pocket. The resulting body will then comprise solidified metal pockets within the cured matrix. Such a body may be a conductive film such as an anisotropic conductive film, a conductive adhesive, a thermally conductive material or a composite.

In the method described herein, the first alternating voltage may be lower than the second alternating voltage. Further, the first frequency may be higher than the second frequency. Alternatively, the first frequency and the second frequency may be of the same magnitude. In an example, the first alternating voltage may be lower than the second alternating voltage while the first and the second frequencies are of the same magnitude. In a further example, the first alternating voltage may be lower than the second alternating voltage while the first frequency is higher than the second frequency. It will be appreciated that magnitude of the alternating voltages and frequencies may be adjusted depending on the intended application of the body being produced. A person skilled in the art will have no difficulty in adjusting alternating voltages and frequencies to produce the desired liquid pockets, through-going passages and/or through-going holes within the curable or cured matrix. Monitoring using, for instance, a light microscope optionally in combination with image analysis as described herein may aid in determining if the voltage and/or frequency is/are appropriate.

Electrodes may be used to supply the first alternating voltage and/or the second alternating voltage and to substantially encompass the mixture comprising liquid, curable matrix and optionally particles. The electrodes may be substantially flat and oriented substantially parallel to each other. The distance between opposing inner sides of the electrodes may be greater than the thickness of the body being produced. This is advantageous since it allows the body to pass through the electrodes in manufacturing. Alternatively, the distance between opposing inner sides of the electrodes may define the thickness of the body being produced. The electrodes may be covered by an isolating material, such as a plastic, in order to prevent for instance short-circuiting.

The liquid described herein may comprise at least one of the following: a glycol derivative, gel forming substance, water, oil, ketone, alcohol, surfactant. It will be appreciated that the liquid may be mixture of different liquids. The liquids may be miscible or immiscible with each other. The surface tension and/or viscosity of the liquid may be adjusted by including a surfactant and/or a gel forming agent. As used herein, a glycol derivative is understood to be an organic compound in which two hydroxyl groups are attached to two different carbon atoms, such as two adjacent carbon atoms. Examples of glycol derivatives include ethylene glycol and propylene glycol. Examples of oils include silicone oil, olive oil and castor oil. Further, gelatin and/or agar may be included to modify the viscosity of the liquid.

The mixture of the method described herein may comprise from 1 vol % to 60 vol % of said liquid. For instance, the amount of liquid may be within the range of from 1 vol % to 50 vol %, from 5 vol % to 40 vol % or from 10 vol % to 35 vol %. It will be appreciated that the amount of liquid to be used will depend on the kind of liquid and the curable matrix being used.

The curable matrix described herein may comprise or consist of a homopolymer or a mixture of homopolymers. In an example, the curable matrix does not comprise a copolymer such as a block copolymer.

Further, the curable matrix described herein may comprise or consist of at least one of the following: epoxy, polyurethane, polysiloxane, mercapto ester, polyacrylate, triacetate cellulose, polycarbonate, polytetrafluoroethylene, polyvinylidene fluoride, polypropylene, polyethylene, polyethylene terephthalate. In an example, the curable matrix may comprise or consist of a polyacrylate and/or a polyurethane.

The body formed by the method described herein may have a maximum thickness within the range of from 10 micrometers to 5 millimeters. For instance, the maximum thickness may be within the range of from 30 micrometers to 2 millimeters or from 50 micrometers to 500 micrometers. In some applications, the body thickness may be substantially the same all over the body while in other applications the body thickness may be allowed to vary. Further, the end use of the body produced using the method described herein may be decisive for the selected thickness.

The method described herein may be performed at room temperature, i.e. at about 20-25° C. such as about 22° C. For instance, at least one of the method steps a), b), c) and d) may be performed at room temperature. In an example, all method steps a), b), c) and d) are performed at room temperature.

Further, it is appreciated that the method described herein may be used in conjunction with a roll-to-roll processing machine as known in the field of film manufacturing.

There is also provided an article comprising or consisting of a body obtainable by the method described herein. The article may have at least one surface that is at least partially smooth and/or at least partially rough. Further, the article and/or body may be substantially three-dimensional or substantially two-dimensional. The article may comprise or consist of at least one of the following: a membrane, fabric, filter, film. For instance, the membrane may be a catalytic membrane, a particulate filtration membrane, a microfiltration membrane or a biofunctional membrane, optionally comprising particles and/or organic matter at least some of which may be exposed in the through-going holes. The film may be a conductive film comprising metal, through-going passages of metal, a semi-transparent film or a film exhibiting optical properties.

There is also provided a use of a body of the method described herein and/or an article as described herein as at least one of the following: a membrane, fabric, filter, film. The membrane, fabric, filter and/or film may be as described herein.

BRIEF DESCRIPTION OF THE DRAWINGS

The invention will now be further described with reference to exemplary embodiments, with reference to the enclosed drawings, wherein:

FIG. 8a shows a light microscope photograph of a top view of a mixture of 20 wt % propylene glycol and 80 wt % polyurethane that had been subjected to an electric field having an associated frequency.

FIG. 8b shows a light microscope photograph of a top view of a mixture of 20 wt % of propylene glycol/water and 80 wt % of polyurethane that had been subjected to an electric field having an associated frequency.

FIG. 9 shows an electrode setup.

FIG. 10a shows a light microscope photograph of a top view of a mixture of liquid, curable matrix and silver coated iron particles.

FIG. 10b shows a light microscope photograph of a top view of a mixture of liquid, curable matrix and silver coated iron particles subjected to a second alternating voltage having a second frequency.

FIG. 10c shows a light microscope photograph of a top view of the mixture of liquid, curable matrix and silver coated iron particles of FIG. 10b further subjected to a first alternating voltage having a first frequency.

FIG. 11 shows a light microscope photograph of a cross section of a cured curable matrix including through-going passages with silver coated iron particles exposed at the interface between the through-going passage and the cured curable matrix.

FIG. 12a shows a light microscope photograph of a top view of a mixture of Wood's metal and curable matrix.

FIG. 12b shows a light microscope photograph of a top view of a mixture of Wood's metal and curable matrix subjected to a first alternating voltage having a first frequency.

FIG. 12c shows a light microscope photograph of a cross section of a cured curable matrix including a through-going passage comprising Wood's metal.

FIG. 15a shows a light microscope micrograph of a top view of a mixture of reduced graphene oxide particles (0.02 wt %), PG (35 wt %) and acrylate (64.98 wt %) after being subjected to 20 kHz and 90 V and 12 kHz and 132 V.

FIG. 15b shows an enlarged view of a part of FIG. 15a.

FIG. 15c shows a light microscope photograph of a top view of a mixture of reduced graphene oxide particles (0.35 wt %), PG (35 wt %) and acrylate (64.65%) after being subjected to 20 kHz and 90 V and 12 kHz and 164 V.

FIG. 15d shows an enlarged view of a part of FIG. 15c.

FIG. 16a shows an ESEM image of a cross section of a 127 micrometer thick material comprising NOA68 including a through-going hole, wherein silver coated glass particles are located at the interface between the NOA68 and air. The liquid PG was removed from the sample by blotting with a tissue paper and drying in room tempered air for 24 hours.

FIG. 16b shows an ESEM image of a cross section of a 127 micrometer thick material comprising NOA68 including a through-going hole that is more narrow as compared to the through-going hole in FIG. 16a. Silver coated glass particles are located at the interface between the NOA68 and air.

FIG. 16c shows an ESEM image of a top view of a 127 micrometer thick material comprising NOA68 including a through-going hole, wherein silver coated glass particles are located at the interface between the cured NOA68 and the air.

FIG. 17a shows an ESEM image of a top view of a 51 micrometer thick perforated film comprising Norland Optical Adhesive 68 including through-going holes comprising Zn particles, wherein the Zinc particles are located near the film surface. The liquid PG was removed from the sample by blotting with a tissue paper and drying in room tempered air for 24 hours.

FIG. 17b shows an ESEM image of a cross section of a 51 micrometer thick perforated film comprising Norland Optical Adhesive 68 including through-going holes comprising Zn particles, wherein the Zinc particles are located near the film surface and in the interface between the Norland Optical Adhesive 68 and air.

FIG. 18a shows an ESEM image of a top view of a 127 micrometer thick perforated film comprising Norland Optical Adhesive 68 including through-going holes comprising Zn particles showing that Zn particles are located near the film surface.

FIG. 18b shows an ESEM image of a cross section of a 127 micrometer thick perforated film comprising Norland Optical Adhesive 68 including through-going holes showing that Zn particles are located at the interface between the Norland Optical Adhesive 68 and air and also concentrate in the central area of the through-going hole.

FIG. 19a shows a light microscope micrograph top view of liquid gallium metal (12.4 wt %) in acrylated polyurethane subjected to a field of 2 kHz and 450 V.

FIG. 19b shows a light microscope micrograph cross section of a 40 μm thick film of liquid gallium metal (12.4 wt %) in acrylated polyurethane subjected to a field of 2 kHz and 450 V.

It should be noted that the drawings have not been drawn to scale and that the dimensions of certain features have been exaggerated for the sake of clarity.

DETAILED DESCRIPTION OF PREFERRED EMBODIMENTS

Figure 1A:
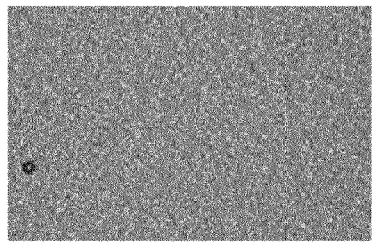
FIG. 1a shows a light microscope photograph of a top view of a mixture of liquid and curable matrix.
Figure 1B:
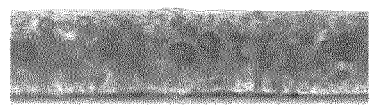
FIG. 1b shows a light microscope photograph of a cross section of a mixture of liquid and curable matrix.
Figure 1C:
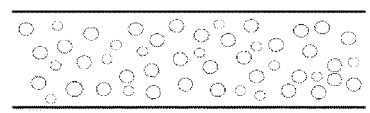
FIG. 1c shows a sketch illustrating the cross section in FIG. 1b.
Figure 2A:
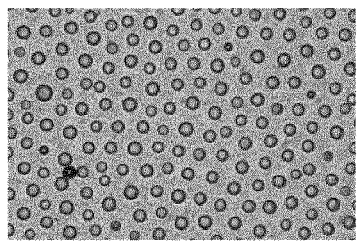
FIG. 2a shows a light microscope photograph of a top view of a mixture of liquid and curable matrix subjected to a second alternating voltage having a second frequency.
Figure 2B:
FIG. 2b shows a light microscope photograph of a cross section of a mixture of liquid and curable matrix subjected to a second alternating voltage having a second frequency.
Figure 2C:
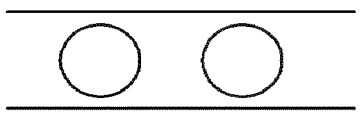
FIG. 2c shows a sketch illustrating the cross section in FIG. 2b.
Figure 3A:
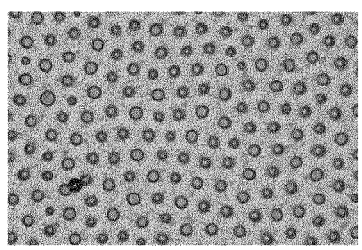
FIG. 3a shows a light microscope photograph of a top view of a cured curable matrix including through-going passages comprising liquid.
Figure 3B:
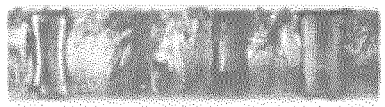
FIG. 3b shows a light microscope photograph of a cross section of a cured curable matrix including through-going passages comprising liquid.
Figure 3C:
FIG. 3c shows a sketch illustrating the cross section in FIG. 3b.

FIGS. 1a-1b, 2a-2b and 3a-3b are light microscope photographs, and FIGS. 1c, 2c and 3c are drawings, showing a mixture of liquid and curable matrix after having been subjected to the treatments described below. FIGS. 1a, 2a and 3a show the mixtures prior to curing. FIGS. 1b, 2b and 3b show the mixtures after curing. The liquid was a mixture of propylene glycol, water and E131. The curable matrix essentially consisted of polyurethane. The loading of the liquid was 10 wt % based on the total weight of the mixture.

FIGS. 1a-1c show the mixture after mixing with a stick followed by vortexing. FIG. 1a is a light microscope photograph of a top view of the mixture. FIG. 1b is a light microscope photograph of a cross section of the mixture. FIG. 1c is a sketch of FIG. 1b. It can be seen that the liquid was dispersed into very small liquid pockets (droplets) which were distributed in a random way in the curable matrix.

The mixture of FIGS. 1a-1c was subjected to an electric field of 83.7 V and a frequency of 22.3 kHz for about 180 s, which made the small liquid pockets coalesce into larger liquid pockets that were substantially evenly distributed within the curable matrix as shown in FIGS. 2a-2c. FIG. 2a is a light microscope photograph of a top view of the mixture. FIG. 2b is a light microscope photograph cross section of the mixture. FIG. 2c is a sketch of FIG. 2b.

Subsequently, the electric field and frequency were changed to 168 V and 12.3 kHz whereby the liquid pockets of the mixture of FIGS. 2a-2c were stretched to form substantially ellipsoid like through-going passages. This is shown in FIGS. 3a-3c. FIG. 3a is a light microscope photograph of a top view of the mixture. FIG. 3b is a light microscope photograph of a cross section of the mixture. FIG. 3c is a sketch of FIG. 3b. UV curing was then applied for 30 s followed by air drying to provide a membrane of a thickness of about 51 micrometers comprising through-going holes.

FIGS. 4a-4d 5a-5d and 6a-6d show light microscope top view photographs of a mixture of liquid and curable matrix for three different thicknesses and four different loadings of liquid. The liquid was a mixture of propylene glycol, water and E131 and the curable matrix consisted essentially of polyurethane. Liquid loadings of 10 wt %, 15 wt %, 20 wt % and 25 wt % based on the total weight of the mixture were tested. Thicknesses of 25 micrometers, 38 micrometers and 51 micrometers were tested. Each thickness was substantially the same all over the sample, and determined by the distance between the electrodes used for producing the electric field and frequency. The mixtures were treated as described in Example 2 herein. The photographs were taken before curing and air drying.

Figures 4A, 4B, 4C, 4D:
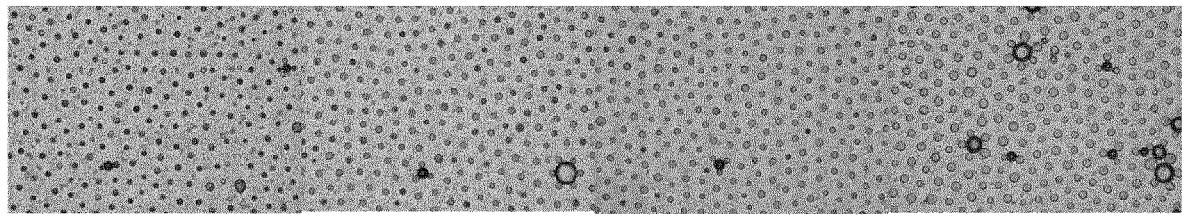
FIG. 4a shows a light microscope photograph of a top view of a membrane with a thickness of 25 micrometers made from 10 wt % of liquid and 90 wt % of curable matrix.
FIG. 4b shows a light microscope photograph of a cross section of a membrane with a thickness of 25 micrometers made from 15 wt % of liquid and 85 wt % of curable matrix.
FIG. 4c shows a light microscope photograph of a top view of a membrane with a thickness of 25 micrometers made from 20 wt % of liquid and 80 wt % of curable matrix.
FIG. 4d shows a light microscope photograph of a top view of a membrane with a thickness of 25 micrometers made from 25 wt % of liquid and 75 wt % of curable matrix.

FIGS. 4a-4d all show membranes having a thickness of 25 micrometers. FIG. 4a shows a liquid loading of 10 wt %. FIG. 4b shows a liquid loading of 15 wt %. FIG. 4c shows a liquid loading of 20 wt %. FIG. 4d shows a liquid loading of 25 wt %.

Figures 5A, 5B, 5C, 5D:
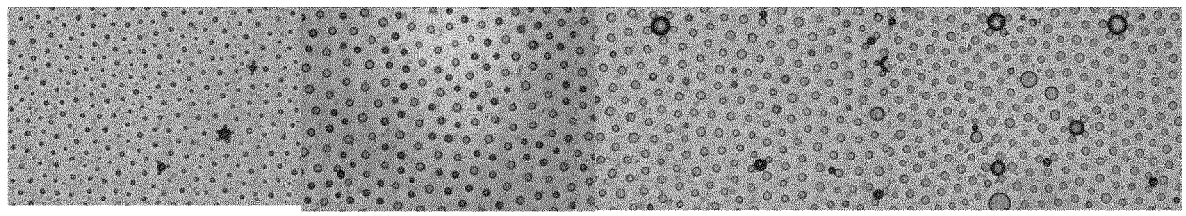
FIG. 5a shows a light microscope photograph of a top view of a membrane with a thickness of 38 micrometers made from 10 wt % of liquid and 90 wt % of curable matrix.
FIG. 5b shows a light microscope photograph of a top view of a membrane with a thickness of 38 micrometers made from 15 wt % of liquid and 85 wt % of curable matrix.
FIG. 5c shows a light microscope photograph of a top view of a membrane with a thickness of 38 micrometers made from 20 wt % of liquid and 80 wt % of curable matrix.
FIG. 5d shows a light microscope photograph of a top view of a membrane with a thickness of 38 micrometers made from 25 wt % of liquid and 75 wt % of curable matrix.

FIGS. 5a-5d all show membranes having a thickness of 38 micrometers. FIG. 5a shows a liquid loading of 10 wt %. FIG. 5b shows a liquid loading of 15 wt %. FIG. 5c shows a liquid loading of 20 wt %. FIG. 5d shows a liquid loading of 25 wt %.

Figures 6A, 6B, 6C, 6D:
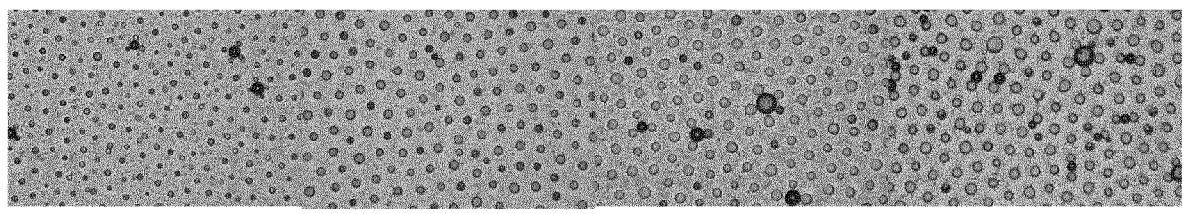
FIG. 6a shows a light microscope photograph of a top view of a membrane with a thickness of 51 micrometers made from 10 wt % of liquid and 90 wt % of curable matrix.
FIG. 6b shows a light microscope photograph of a top view of a membrane with a thickness of 51 micrometers made from 15 wt % of liquid and 85 wt % of curable matrix.
FIG. 6c shows a light microscope photograph of a top view of a membrane with a thickness of 51 micrometers made from 20 wt % of liquid and 80 wt % of curable matrix.
FIG. 6d shows a light microscope photograph of a top view of a membrane with a thickness of 51 micrometers made from 25 wt % of liquid and 75 wt % of curable matrix.

FIGS. 6a-6d all show membranes having a thickness of 51 micrometers. FIG. 6a shows a liquid loading of 10 wt %. FIG. 6b shows a liquid loading of 15 wt %. FIG. 6c shows a liquid loading of 20 wt %. FIG. 6d shows a liquid loading of 25 wt %.

The average size of the formed through-going passages pore size was calculated as described in Example 2.

Figure 7:
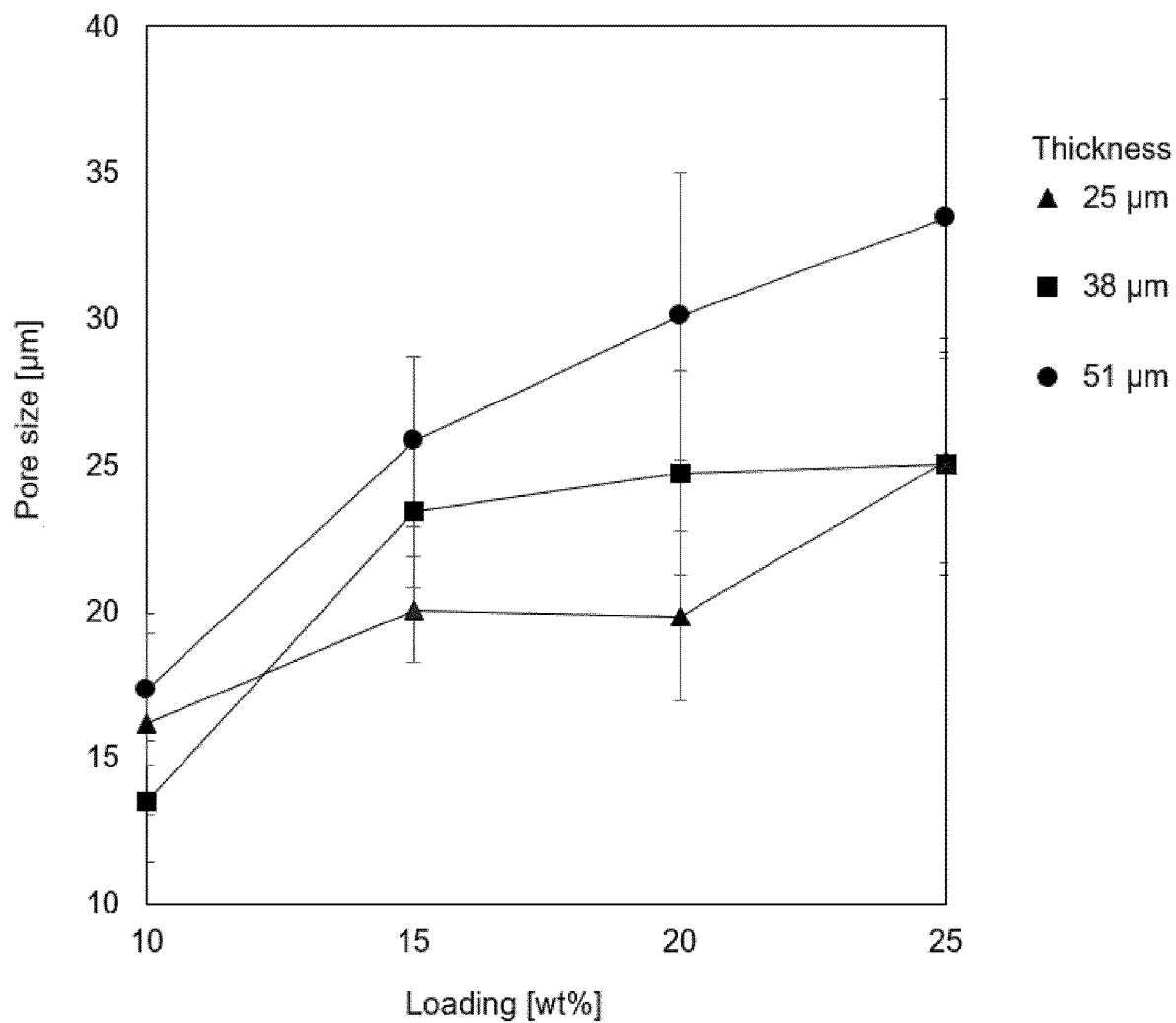
FIG. 7 is a graph showing the average membrane pore size as a function of weight % of added liquid.

FIG. 7 is a graph showing the average membrane pore size, i.e. the size of the through-going passages of the membrane, as a function of weight % of added liquid. It appeared that the membrane pore size increased with increased liquid loading.

FIGS. 8a and 8b show light microscope top view photographs of a mixture of liquid and curable matrix. The liquid loading was 20 wt % based on the total weight of the mixture. The curable matrix consisted essentially of polyurethane. The mixtures were treated as described in Example 4 herein. The photographs were taken after curing but before air drying. In FIG. 8a, the liquid was pure propylene glycol. In FIG. 8b, the liquid was a 50:50 mixture of propylene glycol and water. It was found that the size of the liquid through-going passages increased when the amount of water increased.

FIG. 9 shows a suitable electrode setup for the method described herein. In FIG. 9, 1 are electrodes, 2 and 3 are layers of isolating material, such as PET, 4 is a mixture of liquid and curable matrix, and 5 is a spacer that determines the thickness of the material being produced.

FIG. 10 shows the formation of through-going passages with particles arranged at the interface between the through going passages and the curable matrix. The film is 51 μm thick. FIG. 10a shows a mix of polyurethane, propylene glycol and SI03P40 particles before applying the electric field. FIG. 10b show distribution of droplets and particles at after applying 200 kHz and 80 V. FIG. 10c shows through-going passages of propylene glycol with particles located at the interface the through-going passages and the curable matrix after applying 100 kHz and 180 V.

FIG. 11 is a cross-section of the sample in FIG. 10c, showing particles located at the interface between the through-going holes and the curable matrix.

FIG. 12 shows the formation of solidified liquid metal pockets in silicone (SS-155).

FIG. 12a shows droplets of Wood's metal melted in silicone. FIG. 12b shows the result of applying an electric field to the mixture shown in FIG. 12a of 1 kHz and 460 V to form the through-going passages. FIG. 12c shows a cross-section of the sample with a through-going passage of Wood's metal.

Figure 13A:
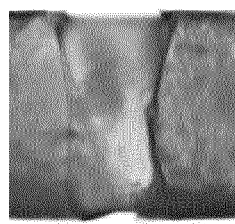
FIG. 13a shows a light microscope photograph of a cross section of a 127 micrometer thick material comprising Norland Optical Adhesive 68 including a through-going hole having a substantially cylindrical shape.
Figure 13B:
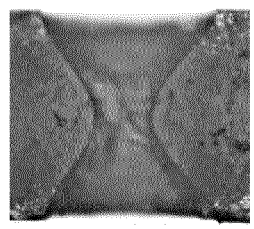
FIG. 13b shows a light microscope photograph of a cross section of a 127 micrometer thick material comprising Norland Optical Adhesive 68 including a through-going hole having the shape of an hourglass.
Figure 13C:
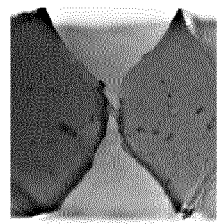
FIG. 13c shows a light microscope photograph of a cross section of a 127 micrometer thick material comprising Norland Optical Adhesive 68 including a through-going hole having the shape of an hourglass with a neck that is narrow compared to the material thickness.

FIGS. 13a, 13b and 13c show the formation of through-going holes that was made in the presence of the surfactant Span 80. The liquid was removed from the sample by blotting with a tissue paper and drying in room tempered air for 24 hours.

FIG. 13a shows a light microscope photograph of a cross section of a 127 micrometer thick material comprising Norland Optical Adhesive 68 including a through-going hole having a substantially cylindrical shape.

FIG. 13b shows a light microscope photograph of a cross section of a 127 micrometer thick material comprising Norland Optical Adhesive 68 including a through-going hole having the shape of an hourglass.

FIG. 13c shows a light microscope photograph of a cross section of a 127 micrometer thick material comprising Norland Optical Adhesive 68 including a through-going hole having the shape of an hourglass with a neck that is narrow compared to the material thickness.

Thus, it could be seen that through-going passages and/or holes of various shapes could be formed in the presence of a surfactant.

Figure 14A:
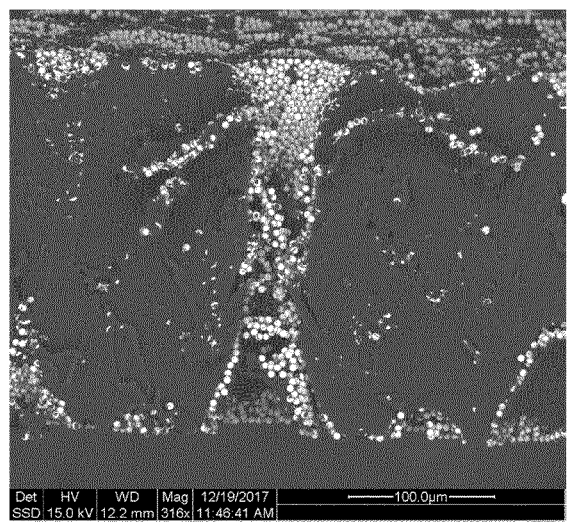
FIG. 14a shows a light microscope photograph of a cross section of a 250 micrometer thick material comprising NOA68 including a through-going hole, wherein nickel-gold coated polymer particles are located at the interface between the NOA68 and the through-going hole.
Figure 14B:
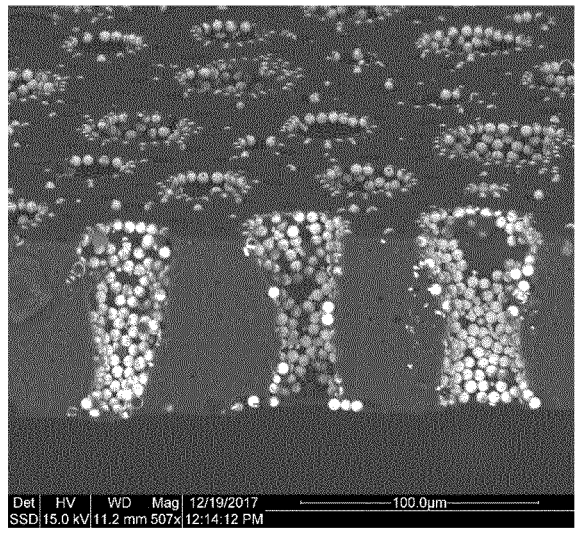
FIG. 14b shows a light microscope photograph of a cross section and top view of a 75 micrometer thick material comprising NOA68 including several through-going holes, wherein nickel-gold coated polymer particles are located at the interface between the NOA68 and the hole.

FIGS. 14a and 14b show the formation of through-going holes in the presence of nickel-gold coated polymer particles. In addition to nickel-gold coated polymer particles, the mixture comprised PG and Norland Optical Adhesive 68. The liquid PG was removed from the sample by blotting with a tissue paper and drying in room tempered air for 24 hours.

FIG. 14a shows a light microscope photograph of a cross section of a 250 micrometer thick material comprising NOA68 including a through-going holes wherein nickel-gold coated polymer particles are located at the interface between the NOA68 and the air. The liquid PG was removed from the sample by blotting with a tissue paper and drying in room tempered air for 24 hours.

FIG. 14b shows a light microscope photograph of a cross section and top view of a 75 micrometer thick material comprising NOA68 including several through-going holes wherein nickel-gold coated polymer particles are located at the interface between the NOA68 and the air. The liquid PG was removed from the sample by blotting with a tissue paper and drying in room tempered air for 24 hours.

FIGS. 15a, 15b, 15c and 15d show the formation of through-going passages in the presence of reduced graphite oxide particles.

FIG. 15a shows a light microscope photograph of a top view of a mixture of reduced graphene oxide particles (0.02 wt %), PG (35 wt %) and acrylate (64.98 wt %) after being subjected to 20 kHz and 90 V and 12 kHz and 132 V.

FIG. 15b shows an enlarged view of part of FIG. 15a.

FIG. 15c shows a light microscope photograph of a top view of a mixture of reduced graphene oxide particles (0.35 wt %), PG (35 wt %) and acrylate (64.65 wt %) after being subjected to 20 kHz and 90 V and 12 kHz and 164 V.

FIG. 15d shows an enlarged view of part of FIG. 15c.

FIGS. 16a, 16b, 16c and 16d show the formation of through-going holes in the presence of silver coated glass particles.

FIG. 16a shows an ESEM image of a cross section of a 127 micrometer thick material comprising NOA68 including a through-going hole, wherein silver coated glass particles are located at the interface between the NOA68 and air. The liquid PG was removed from the sample by blotting with a tissue paper and drying in room tempered air for 24 hours.

FIG. 16b shows an ESEM image of a cross section of a 127 micrometer thick material comprising NOA68 including a through-going hole that is more narrow as compared to the through-going hole in FIG. 16a, wherein silver coated glass particles are located at the interface between the NOA68 and air. The liquid PG was removed from the sample by blotting with a tissue paper and drying in room tempered air for 24 hours.

FIG. 16c shows an ESEM image of a top view of a 127 micrometer thick material comprising NOA68 including a through-going hole, wherein silver coated glass particles are located at the interface between the cured NOA68 and the air. The liquid PG was removed from the sample by blotting with a tissue paper and drying in room tempered air for 24 hours.

FIG. 17a shows an ESEM image of a top view of a 51 micrometer thick perforated film comprising Norland Optical Adhesive 68 including through-going holes comprising Zn particles, wherein the Zinc particles are located near the film surface. The liquid PG was removed from the sample by blotting with a tissue paper and drying in room tempered air for 24 hours.

FIG. 17b shows an ESEM image of a cross section of a 51 micrometer thick perforated film comprising Norland Optical Adhesive 68 including through-going passages comprising PG and Zn particles, wherein the Zinc particles are located near the film surface and in the interface between the Norland Optical Adhesive 68 and air. The liquid PG was removed from the sample by blotting with a tissue paper and drying in room tempered air for 24 hours.

FIG. 18a shows an ESEM image of a top view of a 127 micrometer thick perforated film comprising Norland Optical Adhesive 68 including through-going holes comprising Zn particles showing that Zn particles are located near the film surface. The liquid PG was removed from the sample by blotting with a tissue paper and drying in room tempered air for 24 hours.

FIG. 18b shows an ESEM image of a cross section of a 127 micrometer thick perforated film comprising Norland Optical Adhesive 68 including through-going holes showing that Zn particles are located at the interface between the Norland Optical Adhesive 68 and air and also concentrate in the central area of the through-going hole. The liquid PG was removed from the sample by blotting with a tissue paper and drying in room tempered air for 24 hours.

FIG. 19a shows a light microscope micrograph top view of liquid gallium metal (12.4 wt %) in acrylated polyurethane subjected to a field of 2 kHz and 450 V. This sample was heated to 70° C.

FIG. 19b shows a light microscope micrograph cross section of a 40 μm thick film of liquid gallium metal (12.4 wt %) in acrylated polyurethane subjected to a field of 2 kHz and 450 V. The sample was UV cured and cooled down to room temperature.

FURTHER ASPECTS

The present disclosure also provides the following further aspects.

Further Aspect 1

A method for forming a body comprising at least one through-going passage, said method comprising the steps of:
a) providing a mixture comprising at least one liquid pocket inside a curable matrix,
b) subjecting said mixture to a first alternating voltage having a first frequency to form a body in which said at least one liquid pocket extends from a first surface of said body to a second surface of said body thereby forming at least one through-going passage comprising liquid in said body, and
c) curing said curable matrix into a cured matrix.

Further Aspect 2

A method according to further aspect 1, wherein the mixture of step a) is provided by application of a second alternating voltage having a second frequency to a mixture of liquid and curable matrix.

Further Aspect 3

A method according to further aspect 1 or 2 further comprising a step of:
d) removing the liquid from said at least one through-going passage thereby forming at least one through-going hole.

Further Aspect 4

A method according to any one of the preceding further aspects, wherein said mixture further comprises particles.

Further Aspect 5

A method according to further aspect 4, wherein said particles comprise or consist of at least one of the following: a metal, ceramic, glass, organic material.

Further Aspect 6

A method according to further aspect 4 or 5 when dependent on further aspect 1 or 2, wherein at least some of said particles are located at an interface between said at least one through-going passage comprising liquid and said cured matrix.

Further Aspect 7

A method according to further aspect 4 or 5 when dependent on further aspect 3, wherein at least some of said particles are exposed in said at least one through-going hole.

Further Aspect 8

A method according to any one of further aspect 1-2 or 4-6, wherein said at least one liquid pocket is a liquid metal pocket.

Further Aspect 9

A method according to further aspect 8, wherein the step of curing and/or a step of temperature lowering solidifies the liquid metal pocket.

Further Aspect 10

A method according to any one of the preceding further aspects, wherein said first voltage is lower than said second voltage.

Further Aspect 11

A method according to any one of the preceding further aspects, wherein said first frequency is higher than said second frequency.

Further Aspect 12

A method according to any one of further aspects 1-10, wherein said first frequency and said second frequency are of the same magnitude.

Further Aspect 13

A method according to any one of the preceding further aspects, wherein electrodes are used to supply said first voltage and/or said second voltage and to substantially encompass said mixture.

Further Aspect 14

A method according to any one of the preceding further aspects, wherein said liquid pocket comprises at least one of the following: a glycol derivative, gel forming substance, water, oil, ketone, alcohol, surfactant.

Further Aspect 15

A method according to any one of the preceding further aspects, wherein said mixture comprises from 1 vol % to 60 vol % of said liquid.

Further Aspect 16

A method according to any one of the preceding further aspects, wherein said curable matrix comprises at least one of the following: epoxy, polyurethane, polysiloxane, mercapto ester, polyacrylate, triacetate cellulose, polycarbonate, polytetrafluoroethylene, polyvinylidene fluoride, polypropylene, polyethylene, polyethylene terephthalate.

Further Aspect 17

A method according to any one of the preceding further aspects, wherein the formed body has a maximum thickness from 10 micrometers to 5 millimeters.

Further Aspect 18

A method according to any one of the preceding further aspects, wherein said liquid is a liquid.

The invention is further illustrated by the following non-limitative example.

EXAMPLES

Abbreviations

PG propylene glycol
ESEM Environmental Scanning Electron Microscope
Fig. Figure
NOA68 Norland Optical Adhesive 68
μm micrometers
s second(s)
wt % % by weight
E131 Patent Blue V
PET polyethylene terephthalate
V volt
f frequency
Hz Hertz Materials The electrodes were Fluorine doped Tin Oxide glass purchased from Sigma Aldrich. The liners were release coated 25 μm thick PET from Saint Gobain. The polyurethane was Norland Optical Adhesive 68 (NOA68) purchased from Edmund optics, the silicone was SS-154 and SS-155 UV cure self-leveling silicone adhesive purchased from Silicone solutions, the propylene glycol was purchased from Sigma Aldrich. The light microscopes used were Motic BA410, and Motic SMZ-171 purchased from VWR International. The blue food color was produced by Idun Industrier AS, consisting of a mixture of propylene glycol, water and E131. In this document, E131 is a food additive also denominated patent blue V. Silver coated iron particles 5103P40 were purchased from PQ Corporation, and had a D50 (i.e. mass median diameter) of 4.8 micrometer. Wood's metal pellets were purchased from Sigma Aldrich.

Membranes were made from a dispersion of a liquid, a polymer (Polyurethane, Silicone) and optionally particles by applying an electric field. The process of creating through-going holes, i.e. pores, through the membrane consisted of two steps. The first step was for distribution and creation of almost monodisperse liquid pockets (i.e. droplets) in the matrix. Distribution was performed at high frequency, 21-200 kHz, and low voltage, 85-90 V. The second step created the pores through the polymer by stretching the droplets between the electrodes with the electric field. Stretching was enabled by applying a higher voltage, 100-700 V, at lower frequency, 10-100 kHz. The voltage applied in the second step was depending on the thickness of the membrane, loading of liquid and droplet size. Droplet size also depended on the thickness of the membranes and loading of liquid. When indicated, the second step was followed by a step of curing.

Precise amounts of polymer, liquid, and particles (if used) was measured with a balance. The loading of liquid was calculated as % by weight (i.e. wt %) based on the total weight of the liquid and the curable matrix. The sample mix was stirred with a wooden stick and thereafter vortexed for 30 seconds with the wooden stick inside the dispersion. The two electrodes were cleaned with ethanol to remove dust from the surface. A release liner was placed on each electrode, and spacers of the desired thickness were placed between the electrodes. The sample mixture was vortexed for another 30 seconds before it was squeezed between the electrodes. To avoid disturbing the dispersion the electrodes were taped together and the wires taped to a light microscope. The electric field was turned on and distribution of droplets was observed with the light microscope. The electric field and the frequency were varied in two steps as indicated above. The samples were UV cured for 90 seconds with a Dymax Bluewave 200 UV-light.

Example 1: Formation of a Polyurethane Membrane

The experiments were performed as indicated above. The curable matrix was polyurethane NOA68 and the liquid was blue food color. The membrane thickness was 51 μm. Two electrical fields were applied to the mixture, 21.8 kHz and 85 V for 210 s and thereafter 12.4 kHz and 236 V for 1 s. The samples were cured for 90 s, before air-drying.

FIGS. 1-3 show the results for the experiment performed with 20 wt % loading of blue food color for a 51 μm thick film as observed using a light microscope.

FIGS. 1a, 1b and 1c show a mixture of blue food color and NOA68 after vortexing but prior to application of an electric field. FIG. 1a is a top view of the mixture. FIG. 1b is a cross section view of the mixture. FIG. 1c is a sketch of FIG. 1b. Small liquid droplets dispersed in a random way within the NOA68 were observed.

FIGS. 2a, 2b and 2c show a mixture of blue food color and NOA68 after applying a field of 21.8 kHz and 85 V for 210 s. FIG. 2a is a top view of the mixture. FIG. 2b is a cross section view of the mixture. FIG. 2c is a sketch of FIG. 2b. It was observed that the liquid droplets had coalesced into bigger droplets of substantially spherical shape, and were distributed evenly throughout the mixture.

FIGS. 3a, 3b and 3c show a mixture of blue food color and NOA68 after applying a field of 12.4 kHz and 236 V. FIG. 3a is a top view of the mixture. FIG. 3b is a cross section view of the mixture. FIG. 3c is a sketch of FIG. 3b. It was observed that the droplets were stretched into a substantially ellipsoid form.

Example 2: Influence of Sample Thickness and Loading of Liquid in Polyurethane Three different thicknesses of membranes were tested to investigate their effect on pore size at four different loadings of blue food color. The tested membrane thicknesses were 25 micrometers, 38 micrometers, and 51 micrometers. The tested loadings were 10 wt %, 15 wt %, 20 wt % and 25 wt %. The liquid was blue food color and the curable matrix was NOA68. The settings used are listed in Table 1.

TABLE 1

Settings used to make the samples with various loading of liquid and thickness.

| FIG. | Thickness of sample [μm] | Loading of food color [wt %] | Distribution of droplets f [kHz] | V [V] | Creating through-going passages f [kHz] | V [V] | Time of distribution [s] |
|---|---|---|---|---|---|---|---|
| 4a | 25 | 10 | 22.9 | 85.0 | 12.4 | 130 | 180 |
| 4b | 25 | 15 | 22.3 | 90.0 | 12.0 | 191 | 150 |
| 4c | 25 | 20 | 22.5 | 90.0 | 12.4 | 216 | 180 |
| 4d | 25 | 25 | 21.3 | 82.4 | 12.4 | 260 | 180 |
| 5a | 38 | 10 | 21.9 | 85.0 | 12.3 | 156 | 180 |
| 5b | 38 | 15 | 21.6 | 90.0 | 12.0 | 180 | 180 |
| 5c | 38 | 20 | 21.7 | 90.0 | 12.5 | 190 | 210 |
| 5d | 38 | 25 | 21.6 | 82.0 | 12.6 | 267 | 180 |
| 6a | 51 | 10 | 22.3 | 83.7 | 12.3 | 168 | 180 |
| 6b | 51 | 15 | 21.8 | 90.0 | 12.0 | 188 | 210 |
| 6c | 51 | 20 | 21.8 | 85.0 | 12.4 | 236 | 180 |
| 6d | 51 | 25 | 22.3 | 90.0 | 12.3 | 248 | 180 |

FIGS. 4-6 show the results, which are all top views shown in a light microscope after completion of the second step.

FIG. 4a shows the result for 10 wt % loading for a membrane having a thickness of 25 micrometers. FIG. 4b shows the result for 15 wt % loading for a membrane having a thickness of 25 micrometers. FIG. 4c shows the result for 20 wt % loading for a membrane having a thickness of 25 micrometers. FIG. 4d shows the result for 25 wt % loading for a membrane having a thickness of 25 micrometers.

FIG. 5a shows the result for 10 wt % loading for a membrane having a thickness of 38 micrometers. FIG. 5b shows the result for 15 wt % loading for a membrane having a thickness of 38 micrometers. FIG. 5c shows the result for 20 wt % loading for a membrane having a thickness of 38 micrometers. FIG. 5d shows the result for 25 wt % loading for a membrane having a thickness of 38 micrometers.

FIG. 6a shows the result for 10 wt % loading for a membrane having a thickness of 51 micrometers. FIG. 6b shows the result for 15 wt % loading for a membrane having a thickness of 51 micrometers. FIG. 6c shows the result for 20 wt % loading for a membrane having a thickness of 51 micrometers. FIG. 6d shows the result for 25 wt % loading for a membrane having a thickness of 51 micrometers.

The darker spots observed in the FIGS. 4-6 appeared to be mainly divided droplets that were not pores through the polymer. The dark circles appeared to be air bubbles and were defects in the sample.

The size of the through going passages were measured using the software ImageJ for image analysis. The following kind of passages were excluded from the measurement: passages at the edge of the image, passages attached to an air bubble and tiny droplets between the distributed passages.

The average size and standard deviation of the through going passages were calculated from all the results. FIG. 7 shows the average size of through going passages as a function of loading of liquid. The error bar includes the standard deviation from the data of all the measured pores. For loadings of 10, 15 and 20 wt % it appeared that the size of the passages increased with increasing loading of the liquid and film thickness. The irregularities for the 25 wt % loading may be due to the larger presence of air droplets in this sample.

Example 3: Use of Silicone as Curable Matrix

This example was performed in analogy with Example 1, but silicone (SS-154) was used instead of polyurethane. It could be seen that the liquid pockets were larger and more polydisperse compared to Example 1. Thus, it can be concluded that various curable matrices may be used with the method of the present invention. However, the fact that silicone is a quite stretchable material may make it unsuitable for certain applications. It was observed that removal of the isolating material affected the pore shape making them more elongated.

Example 4: Variation of the Liquid Composition in the Curable Matrix

The composition of the liquid, propylene glycol and water, was varied for a loading of 20 vol % to test changes in properties like pore size. Polyurethane (NOA68) was used as curable matrix.

The liquids tested were (a) pure propylene glycol (PG) and (b) a mixture of 50 vol % PG and 50 vol % water. The experiment was performed in analogy with Example 1.

The results are shown in FIG. 8, which are top views of the mixtures of liquid and curable matrix after a first alternating voltage having a first frequency was applied. FIG. 8a shows the result for 20 vol % loading of pure PG in NOA68. Distribution was performed at 90 V, 21 kHz and through-going passages made at 114V, 10 kHz. FIG. 8b shows the result for 20 vol % loading of a mixture of 50 vol % PG and 50 vol % water in NOA68. Distribution was performed at 90 V, 21 kHz and through-going passages were made at 220 V, 12.3 kHz. It was concluded that the droplet size increased with increased composition of water.

Example 5: Addition of Particles to the Curable Matrix

This example was performed in analogy with Example 1, but with particles added to the curable matrix. 2 wt % of silver coated iron particles SI03P40 and 35 wt % of propylene glycol was mixed together with NOA68 (FIG. 10a). Droplets was distributed at 200 kHz and 80 V (FIG. 10b). The particles move to the interface of the polymer and the propylene glycol. Through-going passages of propylene glycol was made at 100 kHz and 180 V (FIG. 10c and FIG. 11). The sample was UV cured and subsequently air dried. The experiment was observed under a light microscope.

Example 6: Through-Going Metal

Wood's metal (20 wt % loading) was added to silicone (SS-155) at 120° C. and stirred with a magnetic stirrer at 1200 rpm for at least 2 hours. The experiment was performed similar to Example 1, except that the sample thickness was 102 μm and the electrodes were placed on a hot-plate held at 140° C. causing the sample to warm up. An electric field, at 1 kHz and 460 V, was turned on after the metal melted (around 80° C.) and through-going passages of metal was formed. The sample was UV cured. After the silicone had cured, the sample temperature was reduced to room-temperature, solidifying the liquid metal passages. The experiment was observed under a light microscope (FIG. 12).

Example 7: Addition of Surfactants

Surfactant was added to modify the surface tension between the liquid and the curable matrix. 10 wt % Span 80 (i.e. sorbitane monooleate) and 35 wt % of propylene glycol from Sigma Aldrich were mixed together with Norland Optical Adhesive 68 (55 wt %) purchased from Edmund Optics. Droplets were distributed at 20 kHz and 90 V. Two types of shapes of through-going passages in a 127 µm thick material were formed. A cylindrical shape was made at 12 kHz and 132 V while an hourglass shaped through-going hole was made at 12 kHz and 266V, as shown in FIG. 13a and FIG. 13b, respectively. Another hourglass shaped through-going passage was made at 12 kHz and 234 V in a 500 µm thick sample, wherein the neck of said hourglass shaped through-going hole was small compared to the sample thickness, as shown in FIG. 13c. The sample was UV cured. The experiment was observed under a light microscope from Motic BA410 (purchased from VWR International). It was concluded that a surfactant may be present in the method described herein.

Example 8: Nickel-Gold Coated Polymer Particles and Propylene Glycol in Polyurethane 10 wt % of nickel-gold coated polymer particles (particle size was about 5 micrometer) and 35 wt % of propylene glycol (PG) from Sigma Aldrich were mixed together with 55 wt % of Norland Optical Adhesive 68 (NOA68) purchased from Edmund Optics. The sample was prepared at different thicknesses, namely 250 µm and 75 µm. Droplets of PG with particles at the interface (between the PG and the NOA68) were distributed at 20 kHz and 90 V. Through-going holes in the 250 µm thick material were formed at 12 kHz and 342 V (shown in FIGS. 14a) and 12 kHz and 213 V (shown in FIG. 14b). The sample was UV cured. The liquid PG was removed from the sample by blotting with a tissue paper and drying in room tempered air for 24 hours. The experiment was observed under a light microscope from Motic BA410 (purchased from VWR International). Cross-section imaging was performed with an environmental scanning electron microscope (ESEM). The cross-section images show that the polymer particles are preferentially located at the NOA68/air interface after removal of the PG.

Example 9: Reduced Graphene Oxide, Propylene Glycol in Acrylate

Reduced graphene oxide (rGO) particles from Abalonyx, Norway, and propylene glycol (PG) from Sigma Aldrich were mixed together with the acrylate U3345 purchased from Cyberbond. The rGO particles were substantially two dimensional with a particle size of in sub micrometer range in one direction and a few nanometers in the other direction. Two concentrations of reduced graphene oxide particles were tested. The first mixture contained 0.02 wt % reduced graphene oxide particles, 35 wt % PG in the acrylate (64.98 wt %). The second mixture contained 0.35 wt % reduced graphene oxide particles, 35 wt % PG in the acrylate (64.65 wt %). Droplets was distributed at 20 kHz and 90 V for the first mixture and for the second mixture. Through-going passages in a 51 µm thick material were formed at 12 kHz and 132 V for the first mixture (as shown FIG. 15a-b) and 12 kHz and 164 V for the second mixture (as shown in FIG. 15c-d). The sample was UV cured. The experiment was observed under a light microscope from Motic BA410 (purchased from VWR International).

Example 10: Silver Coated Glass Particles and Propylene Glycol in Polyurethane 10 wt % of silver coated glass particles from PQ Corporation (average size 13 micrometer, 16 wt % silver, spherical particles) and 35 wt % propylene glycol (PG) from Sigma Aldrich were mixed together with 55 wt % of Norland Optical Adhesive 68 (NOA 68) purchased from Edmund Optics. The sample thickness was 127 µm. Droplets of PG with particles at the interface (between PG and NOA68) were distributed at 20 kHz and 90 V. Through-going passages were formed at 12 kHz and 334 V. The sample was UV cured followed by removal of the PG. The liquid PG was removed from the sample by blotting with a tissue paper and drying in room tempered air for 24 hours. The experiment was observed under a light microscope from Motic BA410 (purchased from VWR International). Cross-section imaging was performed with an environmental scanning electron microscope (ESEM). FIG. 16a, FIG. 16b and FIG. 16c show that the silver coated glass particles are preferentially located at the NOA68/air interface after removing the PG. More specifically, FIG. 16a and FIG. 16b show a cross-section image of through-going holes, wherein the through-going hole shown in FIG. 16b is narrower than that shown in FIG. 16a. FIG. 16c shows a surface-image, i.e. a top view, of a through-going hole.

Example 11a: Zn Particles and Propylene Glycol in Polyurethane

Zn particles (5 vol %, average particle size was about 1 micrometer) from Reactive Metal Particles, Norway, and 35 vol % propylene glycol (PG) from Sigma Aldrich were mixed together with Norland Optical Adhesive 68 (60 vol %) purchased from Edmund Optics. The sample thickness was 51 µm. Droplets of PG with the particles at the interface (between PG and NOA68) were distributed at 20 kHz and 90 V. Through-going passages were formed at 5 kHz and 550 V. The sample was UV cured followed by removal of the propylene glycol thereby providing a perforated film. The liquid PG was removed from the sample by blotting with a tissue paper and drying in room tempered air for 24 hours. The experiment was observed under a light microscope from Motic BA410 (purchased from VWR International). Cross-section imaging was performed with an environmental scanning electron microscope (ESEM). From the cross-section ESEM imaging it was observed that the Zn particles were located at the interface between the Norland Optical Adhesive 68 and air and preferentially oriented near the surface of the film. FIG. 17a shows a top view ESEM image of the sample after curing and removal of the PG. FIG. 17b shows a cross section ESEM image of a through-going hole.

Example 11b: Zn Particles and Propylene Glycol in Polyurethane

A similar experiment to Example 11a with the same particles was performed, but with Zn particles blocking the through-going passages. The mixture was 1 vol % Zn particles from Reactive Metal Particles AS, Norway, and 35 vol % propylene glycol (PG) from Sigma Aldrich and Norland Optical Adhesive 68 (64 vol %) purchased from Edmund Optics. The sample thickness was 127 μm. Droplets of PG with particles at the interface (between the PG and NOA68) were distributed at 20 kHz and 90 V. Through-going passages were formed at 12 kHz and 265 V. The sample was UV cured followed by removal of the PG to provide a film. The liquid PG was removed from the sample by blotting with a tissue paper and drying in room tempered air for 24 hours. The experiment was observed under a light microscope from Motic BA410 (purchased from VWR International). Cross-section imaging was performed with an environmental scanning electron microscope (ESEM). In this case the cross-sections showed that the Zn particles were preferentially distributed near the surface of the film, and in the central area of the through-going passages. FIG. 18a shows a top view ESEM image of the sample after curing and removal of the PG. FIG. 18b shows a cross section ESEM image of through-going holes.

Example 12: Droplets of Liquid Gallium Metal Aligned in Polymer Matrix

Pure gallium metal purchased from Luciteria Science, LLC were mixed (12.4 wt %) together with the acrylated polyurethane Norland Optical Adhesive 68 (87.6 wt %) purchased from Edmund Optics. Gallium metal is a liquid when heated above 30° C. The mixture containing gallium metal and polymer was heated to 70° C., thereafter stirred with ultrasonic stirrer for 5 minutes to create smaller droplets of gallium metal in the liquid polymer phase. Micro sized droplets of liquid gallium metal were formed. Thereafter, the mix was made into a thin liquid film of 40 μm between two electrodes. It was kept heated at 70° C. at a heating plate with thermal isolation above the set-up to ensure gallium metal stayed liquid during the experiment. Droplets coalesced, and through-going passages were formed at 2 kHz and 450 V, as shown in FIG. 19a. The thermal isolation above the sample was removed and the sample was UV cured. Cooling down the film after UV curing made the through-going passages solid, as shown in FIG. 19b.

The invention claimed is:

1. A method for forming a body comprising a plurality of through-going passages, said method comprising the steps of:
a) providing a mixture comprising a plurality of liquid pockets inside a curable matrix, wherein the liquid pockets are in the form of droplets;
b) forming said body by stretching the liquid pockets to extend from a first surface of said body to a second surface of said body by subjecting said mixture to a first alternating voltage having a first frequency, thereby forming said plurality of through-going passages wherein each through-going passage lacks curable matrix, and
c) curing said curable matrix into a cured matrix, wherein the mixture of step a) is provided by application of a second alternating voltage having a second frequency to a mixture of liquid and said curable matrix, wherein each through-going passage of the plurality of through-going passages in cross-section has a shape of a column, an ellipsoid, a spheroid, an hourglass, or a meniscus.

2. The method according to claim 1, wherein said plurality of through-going passages comprises liquid.

3. The method according to claim 2 further comprising a step of: d) removing the liquid from said plurality of through-going passages thereby forming a plurality of through-going holes.

4. The method according to claim 3, wherein the mixture further comprises a plurality of particles, wherein at least one of said plurality of particles is exposed in said plurality of through-going holes.

5. The method according to claim 1, wherein said plurality of liquid pockets comprises a metal.

6. The method according to claim 5, wherein the step of curing and/or a step of temperature lowering solidifies the plurality of liquid metal pockets.

7. The method according to claim 1, wherein said first alternating voltage is lower than said second alternating voltage.

8. The method according to claim 1, wherein said first frequency is higher than said second frequency.

9. The method according to claim 1, wherein said first frequency and said second frequency are of the same magnitude.

10. The method according to claim 1, wherein electrodes are used to supply said first voltage and/or said second voltage and to substantially encompass said mixture.

11. The method according to claim 1, wherein said plurality of liquid pockets comprise at least one of the following: a glycol derivative, a gel forming substance, water, an oil, a ketone, an alcohol, and a surfactant.

12. The method according to claim 1, wherein said mixture comprises within a range of from 1 vol % to 60 vol % of said liquid.

13. The method according to claim 1, wherein the curable matrix comprises a homopolymer or a mixture of homopolymers.

14. The method according to claim 1, wherein said curable matrix comprises at least one of the following: an epoxy, polyurethane, polysiloxane, a mercapto ester, polyacrylate, triacetate cellulose, polycarbonate, polytetrafluoroethylene, polyvinylidene fluoride, polypropylene, polyethylene, and polyethylene terephthalate.

15. The method according to claim 1, wherein the formed body has a maximum thickness within a range of from 10 micrometers to 5 millimeters.

16. The method according to claim 1, wherein at least one of steps a), b) and c) is performed at room temperature.

17. The method according to claim 1, wherein each through-going passage of the plurality of through-going passages in cross-section has a shape of an hourglass.

18. The method according to claim 1, wherein each through-going passage of the plurality of through-going passages in cross-section has a shape of an ellipsoid.

* * * * *